US012611578B2

(12) United States Patent　　(10) Patent No.:　US 12,611,578 B2
Alf　　(45) Date of Patent:　Apr. 28, 2026

(54) BAT BAG

(71) Applicant: Spiderz Sports, LLC, Sullivan, WI (US)

(72) Inventor: J. Edward Alf, Sullivan, WI (US)

(73) Assignee: Spiderz Sports, LLC, Sullivan, WI (US)

( * ) Notice: Subject to any disclaimer, the term of this patent is extended or adjusted under 35 U.S.C. 154(b) by 77 days.

(21) Appl. No.: 18/379,310

(22) Filed: Oct. 12, 2023

(65) Prior Publication Data

US 2024/0123309 A1　　Apr. 18, 2024

Related U.S. Application Data

(60) Provisional application No. 63/416,167, filed on Oct. 14, 2022.

(51) Int. Cl.
| | |
|---|---|
| *A45C 5/00* | (2006.01) |
| *A63B 60/60* | (2015.01) |
| *B62B 1/00* | (2006.01) |
| *B65D 85/00* | (2006.01) |
| *A45C 3/00* | (2006.01) |
| *A45C 5/14* | (2006.01) |
| *A63B 102/18* | (2015.01) |

(52) U.S. Cl.
CPC ........ *A63B 60/60* (2015.10); *A45C 2003/007* (2013.01); *A45C 5/14* (2013.01); *A63B 2102/18* (2015.10); *B62B 2202/40* (2013.01)

(58) Field of Classification Search
CPC . A63B 60/60; A63B 71/0036; A63B 71/0045; A63B 2102/18; A63B 71/00; A63B 55/00; B62B 1/00; B62B 1/12; B62B 2202/40; A45C 7/0045; A45C 13/262; A45C 2003/007; A45F 5/1566; A45F 5/14

USPC ...................................................... 206/315.1
See application file for complete search history.

(56) References Cited

U.S. PATENT DOCUMENTS

| | | | | |
|---|---|---|---|---|
| 4,227,710 A | * | 10/1980 | Laub .................. | A63B 69/0002 280/DIG. 6 |
| 4,865,346 A | * | 9/1989 | Carlile ..................... | B62B 1/12 280/654 |
| 5,203,815 A | * | 4/1993 | Miller ................... | A01K 97/08 280/654 |
| 5,295,565 A | * | 3/1994 | Latshaw ................. | A45C 5/14 190/102 |
| 5,431,262 A | * | 7/1995 | Rekuc ................... | A45C 13/30 190/102 |
| 5,588,529 A | * | 12/1996 | Speck ................... | A63B 60/60 190/110 |
| 5,660,476 A | * | 8/1997 | DeCoster ............... | A45C 13/02 383/110 |
| 5,975,293 A | * | 11/1999 | Fowler .................. | A63B 60/60 206/315.9 |
| 6,164,425 A | * | 12/2000 | Latshaw ................. | A45C 5/14 206/315.3 |
| 7,559,423 B2 | * | 7/2009 | Vosloo ................. | A45C 11/00 206/315.1 |

(Continued)

*Primary Examiner* — Gideon R Weinerth
(74) *Attorney, Agent, or Firm* — Boyle Fredrickson, S.C.

(57) ABSTRACT

An improved sporting equipment bag is provided in which the bag includes a roller portion and a pack portion releasably secured to the roller portion. The separability of the pack portion enables the sporting equipment bag to function as either a roller bag or a bat pack, as desired.

6 Claims, 4 Drawing Sheets

(56) References Cited

U.S. PATENT DOCUMENTS

| | | | | |
|---|---|---|---|---|
| 7,997,591 B2 * | 8/2011 | Arthur | B62B 1/22 | 280/37 |
| 7,997,594 B1 * | 8/2011 | Mortazavi | B62B 1/008 | 206/315.9 |
| D671,316 S * | 11/2012 | Kritzler | D3/279 | |
| D702,968 S * | 4/2014 | Smith | D6/552 | |
| 8,820,523 B1 * | 9/2014 | Breza | A63B 47/005 | 126/681 |
| D720,535 S * | 1/2015 | Marabotto | D3/279 | |
| 9,132,332 B2 * | 9/2015 | Schuster | A63B 71/0045 | |
| 10,039,361 B2 * | 8/2018 | Herold | A45C 13/262 | |
| 2002/0148741 A1 * | 10/2002 | Stobbs | A45C 3/00 | 206/112 |
| 2003/0042157 A1 * | 3/2003 | Mays | A45C 13/10 | 206/315.9 |
| 2004/0188963 A1 * | 9/2004 | Gant | B62B 1/125 | 280/47.24 |
| 2005/0052100 A1 * | 3/2005 | Horning | B62B 1/12 | 211/14 |
| 2005/0077136 A1 * | 4/2005 | Brannin | A45C 7/0045 | 190/18 A |
| 2006/0037877 A1 * | 2/2006 | Souza | A45C 3/00 | 206/315.1 |
| 2007/0034546 A1 * | 2/2007 | Vosloo | A45C 11/00 | 206/443 |
| 2008/0093238 A1 * | 4/2008 | Handelman | A63B 47/007 | 206/315.91 |
| 2008/0223677 A1 * | 9/2008 | Mauro | A45C 5/14 | 190/102 |
| 2010/0059322 A1 * | 3/2010 | Reali | A45C 7/0045 | 190/108 |
| 2017/0080311 A1 * | 3/2017 | Cain | A47C 7/42 | |
| 2017/0319920 A1 * | 11/2017 | Filip | A63B 55/408 | |
| 2017/0368440 A1 * | 12/2017 | Graham | B62B 3/10 | |
| 2019/0150596 A1 * | 5/2019 | Cummings | A45C 5/14 | |
| 2020/0360792 A1 * | 11/2020 | Kalfa | A45C 13/262 | |
| 2021/0031080 A1 * | 2/2021 | Sanchez | A63B 60/60 | |
| 2024/0091622 A1 * | 3/2024 | Hacking | A63B 60/58 | |
| 2024/0123309 A1 * | 4/2024 | Alf | A45C 5/14 | |

* cited by examiner

BAT BAG

CROSS-REFERENCE TO RELATED APPLICATIONS

This application claims priority from U.S. Provisional Application Ser. No. 63/416,167, filed on Oct. 14, 2022, the entirety of which is expressly incorporated herein by reference for all purposes.

FIELD OF THE DISCLOSURE

The present disclosure relates generally to sports equipment, and more specifically to a bag for holding and transporting sports equipment including bats for baseball and softball.

BACKGROUND OF THE DISCLOSURE

Bags for sports equipment have a variety of configurations depending upon the types and/or shapes of the sporting equipment to be placed within the bags. For bags used to hold baseball and softball equipment, the main issue for bag is the accommodation of the baseball and/or softball bat within the bag, in addition to other necessary equipment, including gloves, balls, shoes, etc.

In one attempt to provide a bag for effectively holding and transporting bats and other baseball and softball equipment, a roller bag has been developed. The roller bag includes an enclosure that has dimensions capable of retaining the entire length of the bat within the bag. The roller bag includes a number of additional compartments capable of holding other equipment therein, such as gloves, balls, uniforms, etc. To transport the bag, due to its size, the bag includes a rigid lower surface that supports the compartments and a number of wheels disposed at one end of the lower surface. Using a handle disposed on the enclosure opposite the wheels, the user can grasp the handle and wheel the bag to the desired location.

However, as a result of the large size of the roller bag, i.e., an interior capable of enclosing entire bats therein, the bag requires significant amounts of material in its construction. Further, as the length of the bats defines at least the required length of the bag, on many occasions the majority of the interior enclosure of the bag is not occupied or filled with equipment, as the bats require a significant length but not a corresponding significant width or depth, such that the shape and/or configuration of the bag is not efficiently utilized to hold equipment therein.

Due to the large size and often unwieldy shape of the roller bag, other alternative bag designs have been developed. In one alternative design, a bat pack is formed similarly to a back pack with a smaller enclosure including one or more access openings that can be carried on the back of a user a using pair of straps attached to the exterior of the enclosure. To hold a bat on the bat pack, the enclosure additionally includes one or more tubular sleeves disposed on the sides of the enclosure. The sleeves receive the barrel of a bat in order to retain the bat within the sleeve while the bat pack is carried along with any other equipment that can be placed within the enclosure.

While bat pack addresses the issues of the overlarge size and shape of the roller bag, the shoulder-carried bat pack itself has various issues concerning the much smaller enclosure available for retaining equipment therein, as well as the exposed position of the bats along the exterior od the bat pack, that can allow the bats to be entangled with and/or contacted by objects in the environment around the bat pack and the individual carrying the bat pack.

As such, each type of sports equipment bag described previously includes certain shortcomings with regard to the capacity of the enclosure and the manner in which the bag is transported. Thus, it is desirable to develop a sporting equipment bag that addresses and overcomes the shortcomings of these prior art equipment bags.

SUMMARY OF THE DISCLOSURE

According to one aspect of an exemplary embodiment of the disclosure, a sports equipment bag includes a roller portion and a pack portion releasably secured to the roller portion. The roller portion is formed with a frame having an elongate portion and a short portion. The elongate portion defines an interior having number of channels therein, each channel being accessible to receive a bat or other elongate piece of sport equipment therein. The stiffness of the material forming the elongate portion enables the channels to form a protective enclosure for the equipment, e.g., bats, placed therein, as well as forming a base to support the remainder of the sports equipment bag when being moved, such as by using wheels rotatably secured to the frame.

The frame also includes a short portion connected to the elongate portion at an angle with respect to the elongate portion, e.g., perpendicular to the elongate portion, and forming a base on which the bag can rest in an upright position. The short portion supports a first enclosure in which a number of items of sports equipment can be placed. The first enclosure can be formed to be be removable from the short portion.

The elongate portion of the frame is adapted to support a second enclosure thereon, where the second enclosure is adapted to receive and retain sports equipment items therein, separate from the first enclosure. The second enclosure includes attachment members thereon that can be releasably engaged with complementary attachment structures on the elongate portion to removably engage the second enclosure with the elongate portion. When separated from the elongate portion, the second enclosure also includes a number of carrying straps thereon that can be employed by an individual to carry the second enclosure separately from the frame and the first enclosure.

According to another aspect of an exemplary embodiment of the disclosure, an improved sporting equipment bag is provided in which the bag includes a roller portion and a pack portion releasably secured to the roller portion. The separability of the pack portion enables the sporting equipment bag to function as either a roller bag or a bat pack, as desired.

Numerous additional aspects, features and advantages of the present disclosure will be made apparent from the following detailed description taken together with the drawing figures.

BRIEF DESCRIPTION OF THE DRAWINGS

The drawings illustrate the best mode currently contemplated of practicing the present invention.

In the drawings.

DETAILED DESCRIPTION OF THE DRAWINGS

Figure 1:
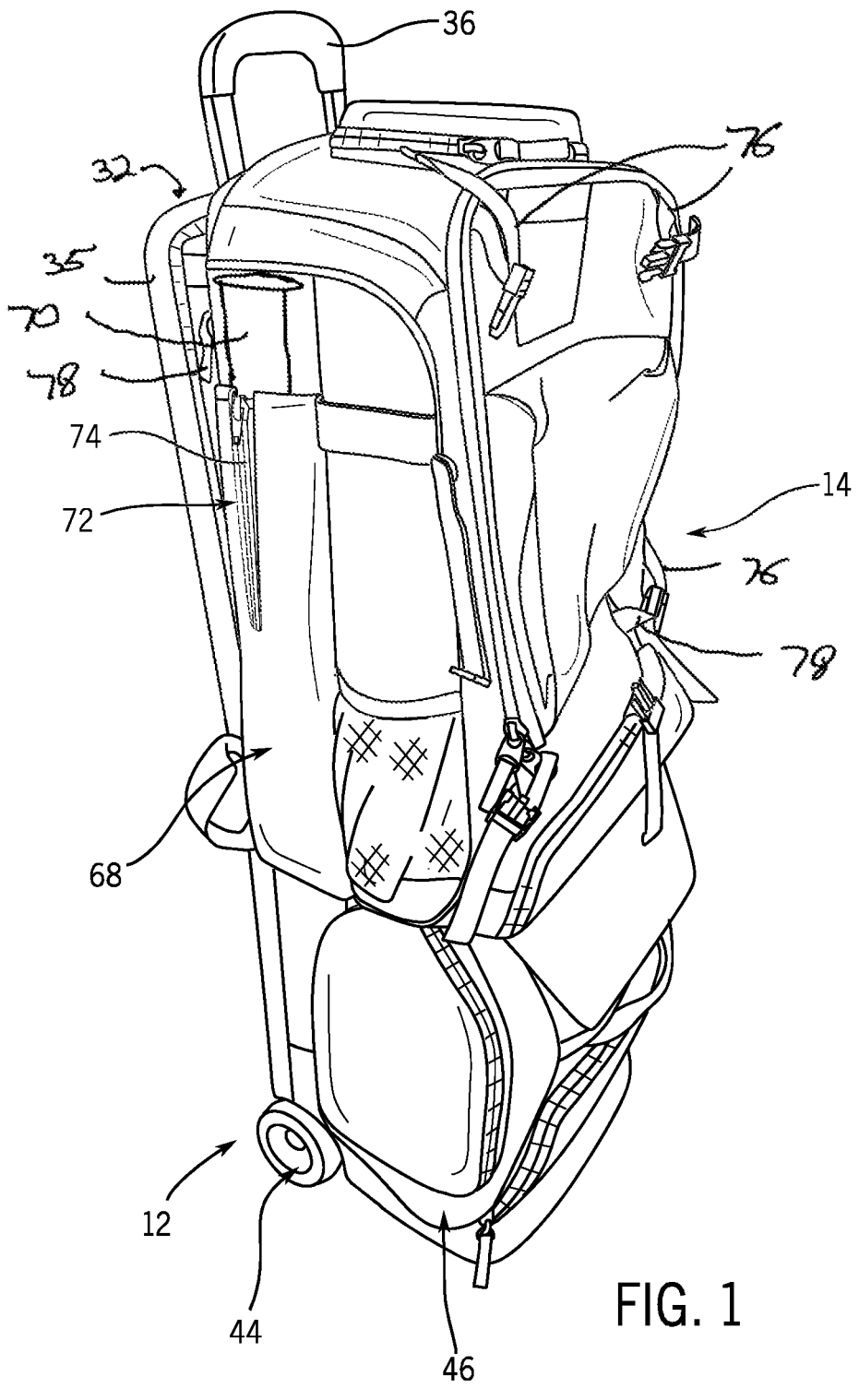
FIG. 1 is a perspective view of an exemplary embodiment of a sporting equipment bag formed according to the present disclosure.
Figure 2:
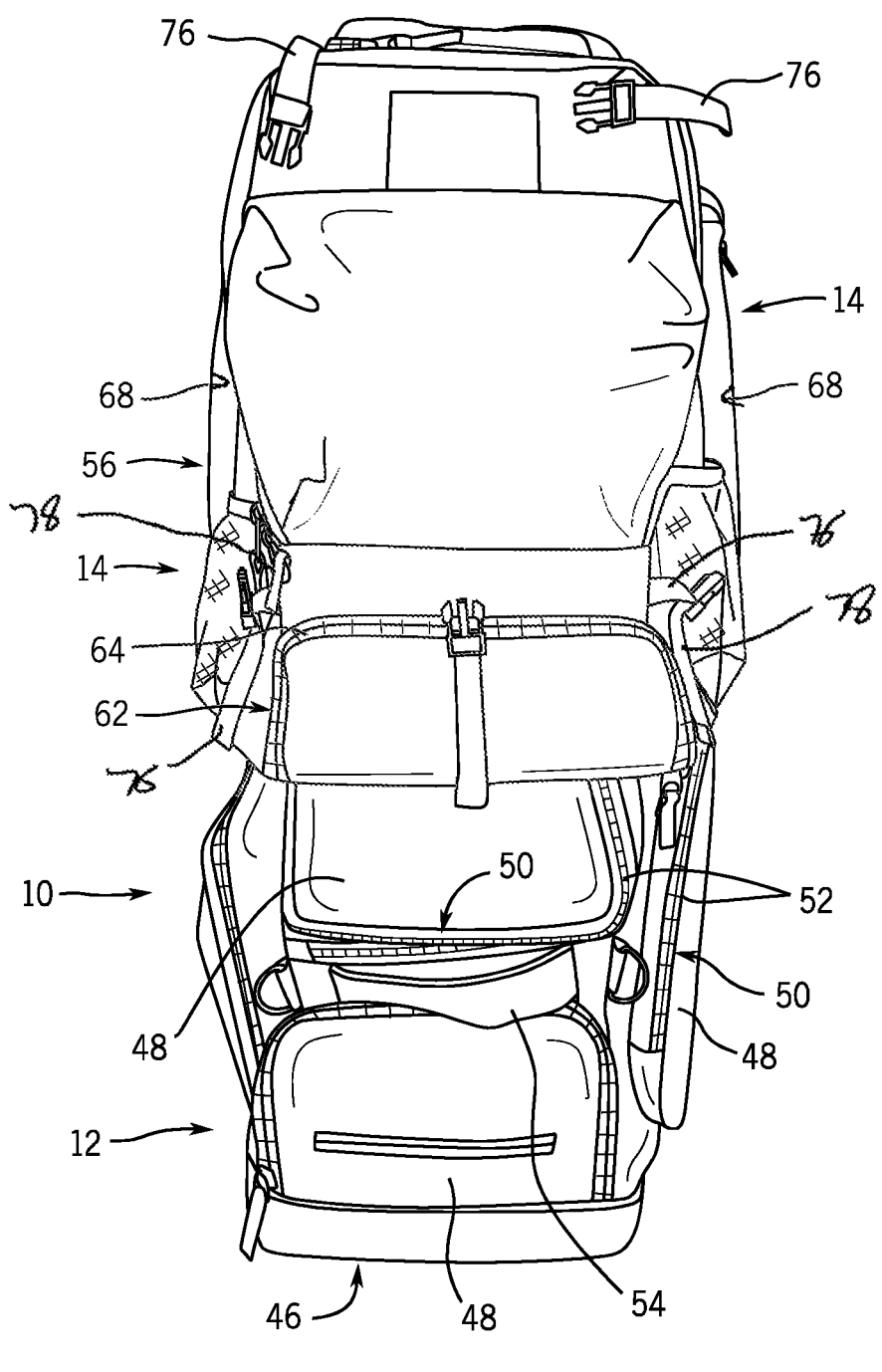
FIG. 2 is a front elevation view of the sporting equipment bag of FIG. 1.
Figure 3:
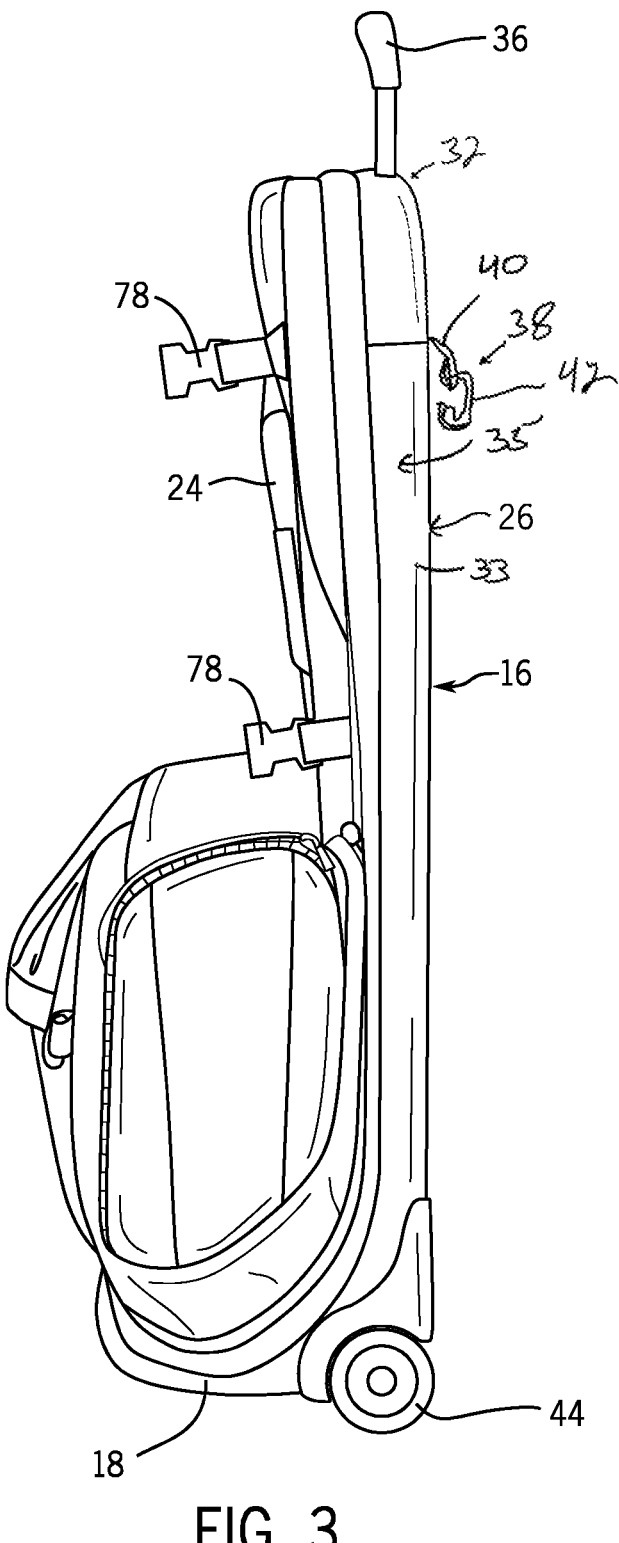
FIG. 3 is a side elevation view of a second configuration of the sporting equipment bag of FIG. 1.

With reference now to the drawing figures in which like reference numerals designate like parts throughout the disclosure, FIGS. 1-3 illustrate an exemplary embodiment of a sporting equipment bag 10 constructed according to the present disclosure. The bag 10 includes a main portion 12 and a separable portion 14 releasably connected to the main portion 12.

Referring now to FIGS. 1-6, the main portion 12 includes a substantially stiff or rigid frame 16 including a short portion 18 and an elongate portion 20, forming an L-shape for the frame 16 that allows the frame 16 to rest stably on a surface in either orientation along the short portion 18 or the elongate portion 20.

Figures 4A, 4B, 5A, 5B, 6:
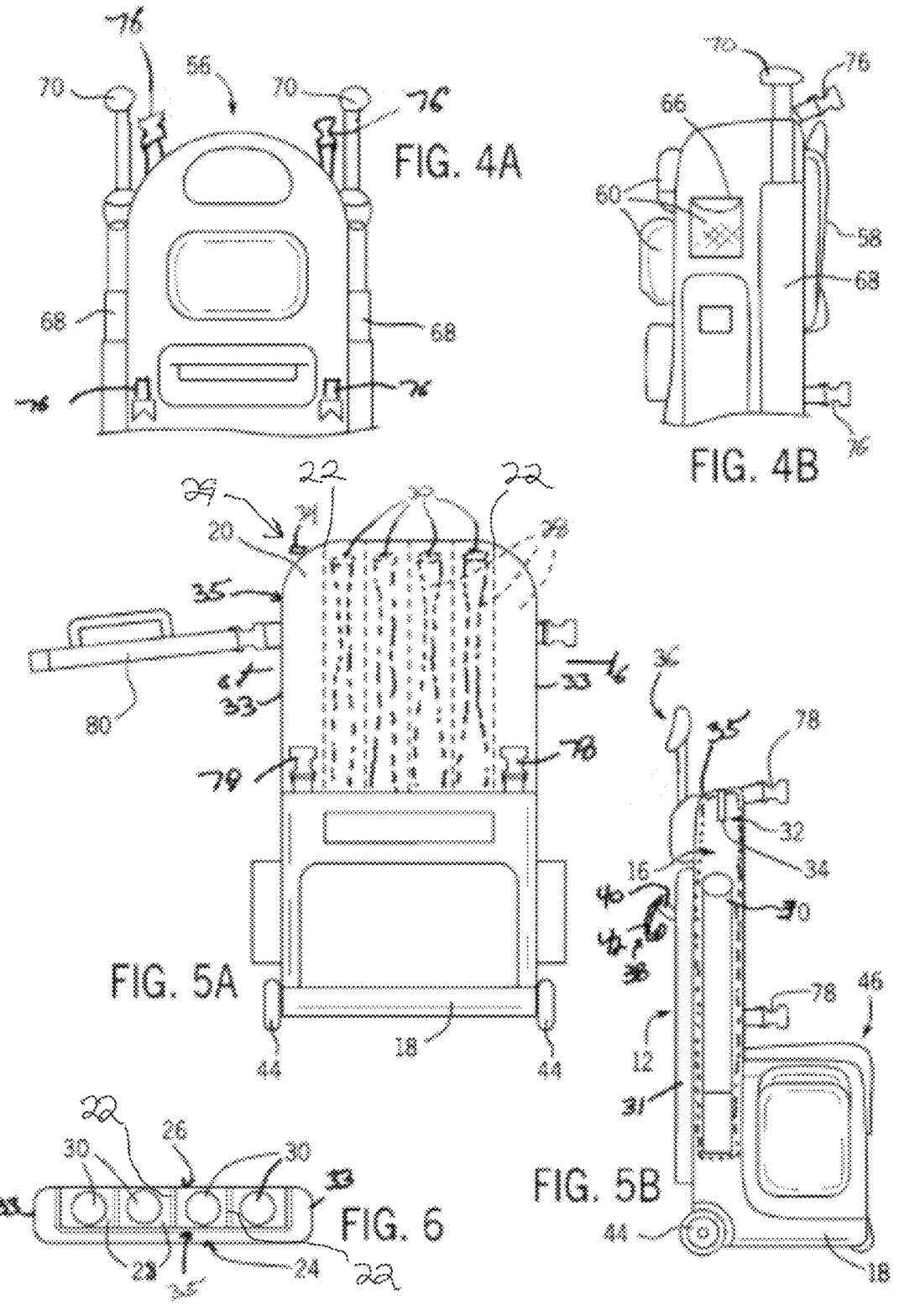
FIG. 4A is a front elevation view of the separable portion of the sporting equipment bag of FIG. 1.
FIG. 4B is a side elevation view of the separable portion of the sporting equipment bag of FIG. 4A.
FIG. 5A is a front elevation view of the main portion of the sporting equipment bag of FIG. 1.
FIG. 5B is a side elevation view of the main portion of the sporting equipment bag of FIG. 4A.
FIG. 6 is a cross-sectional view along line 6-6 of FIG. 5A.

The elongate portion 20, as best shown in FIGS. 3, 5A and 5B, is formed with a generally hollow construction that includes a number of separating walls 22 (FIG. 6) spaced from one another, e.g., optionally equidistant from one another, and extending between a front surface 24 and a rear surface 26 of the elongate portion 20 that are peripherally joined to one another to define a number of channels 28 therein. Optionally, the rear surface 26 can be formed from a stiff material, such as a plastic or metal, while the front surface 24 and separating walls 22 are formed from a less stiff material, such as a natural or synthetic fabric material, in order to enable the channels 28 to flex towards the rear surface 26, while the rear surface 26 provides a protective barrier to items placed within the channels 28. The rear surface 26 can additionally be formed with a number of peripheral side walls 33 that extend between the rear surface 26 and the front surface 24 in a direction generally parallel to the separating walls 22 to create a shell 35 around the channels 28. The rear surface 26 can also include other structures thereon, such as rails 31, to assist in the enclosing and protection of items positioned within the channels 28. The channels 28 generally extend the length of the elongate portion 20 and have a sufficient length to enable each channel 28 to enclose a bat 30 therein. The channels 28 are selectively opened by a suitable closure 29 disposed along a top end 32 of the elongate portion 20 opposite the short portion 18, such as a zipper 34 or other suitable closure that can selectively join the front surface 24 to the rear surface 26 and/or the peripheral side walls 33 connected to the rear surface 26 at or adjacent the top end 32 to selectively access the channels 28 and items, e.g., bats 30, positioned therein.

At or near the top end 32 of the elongate portion 20, e.g., on the rear surface 26 and/or a side wall 33 connected to the rear surface 26, additionally includes a handle 36 to be grasped by a user, and/or a number of hanging members 38. The handle 36 can be disposed on the exterior of the elongate portion 20, or can be formed as a telescoping and/or retractable handle that is at least partially disposed within the shell 35 to selectively extend from within the shell 35 for use. The hanging members 38 each include a strap 40 secured to the elongate portion 20, e.g., the shell 35, at one end and a hook 42 secured to the strap 40 at the opposite end of the strap 40. The hook 42 can be selectively engaged with a separate structure (not shown), such as a fence or wall, to support the equipment bag 10 in an elevated position above a surface.

At the intersection of the short portion 18 and the long portion 20, the frame 16 optionally includes a number of wheels 44 that are rotatably attached to the frame 16. The wheels 44 enable the frame 16 to be readily moved by an individual by grasping the handle 36 and pulling the frame 16 over a surface using the wheels 44.

The short portion 18 supports a first enclosure 46 thereon. The first enclosure 46 is secured to the frame 16 along the short portion 18 and partially along the long portion 20. The first enclosure 46 includes a number of compartments 48 formed therein that are formed as one or more open ended or selectively accessible closed pockets including suitable closures 50, such as zippers 52, to provide a number of storage locations both on and within the first enclosure 46. In certain embodiments where the first enclosure 46 is fixed to the frame 16, the first enclosure 46 may additionally include a handle 54 secured to the exterior of the first enclosure 48 to provide an additional point where an individual can grasp and move the frame 16 and bag 10. Alternatively, where the first enclosure 48 is removably secured to the frame 16, such as through the use of suitable attachment straps (not shown) releasably engaged between the first enclosure 48 and the short portion 18 and/or elongate portion 20 of the frame 16, the handle 54 can be omitted or used to assist in the removal of the first enclosure 48 from the frame 16. In addition to the first enclosure 48 being formed with compartments therein, the position of the first enclosure 48 on the frame 16 at the intersection of the short portion 18 and the elongate portion 20 allows the frame 16 to support a significant amount of weight within the foist enclosure 48. As such, the first enclosure 48 can either partially or totally be configured as a cooler with insulated compartments to retain food and beverages therein.

Referring now to FIGS. 4A-4B, the separable portion 14 is formed as bat pack, with a second enclosure 56 formed with a pair of carrying straps 58 attached thereto. The straps 58 can be positioned around the shoulders of a user to enable the separable portion 14 to be carried by the user in a hands-free manner. The second enclosure 56 includes a number of compartments 60 formed therein that are open ended pockets or selectively accessible using suitable closures 62, such as zippers 64 and flaps 66 including hook and loop or mechanical fasteners, among others, to releasably secure the flaps 64 in closed position, to provide a number of storage locations both on and within the second enclosure 56.

The separable portion 14 can additionally include one or more sleeves 68 disposed on the exterior of the second enclosure 56, such as on opposed sides of the second enclosure 56. The sleeves 68 are designed to receive and hold a bat 70 therein, and in one exemplary embodiment are formed of a stretchable material that can expand to receive the bat 70 therein, while also compressing around the bat 70 to securely engage the bat 70 within the sleeve 68. The sleeves 68 can also include suitable closures 72, such as zippers 74, that are disposed at an open end of the sleeve 68, optionally opposite a closed end of the sleeve 68, that can be operated to expand the diameter of the sleeves 68 and assist in inserting and removing the bat 70 from within the sleeve 68.

Looking now at FIGS. 2-5B, in order to engage the separable portion 14 with the main portion 12, the second enclosure 56 is formed with a number of first securing straps 76 fixed thereto. These first securing straps 76 are selectively engageable with complementary second securing straps 78 fixed to the main portion 12, e.g., on the elongate portion 20 of the frame 16 and/or on the first enclosure 46. The engagement of the first securing straps 76 with the second securing straps 78 positions the separable portion 14 in a stable and secure location on the main portion 12, such that the main portion 12 and the separable portion 14 can be moved and/or transported as a single unit. In this manner the bag 10 can selectively function as either an overnight or weekend equipment bag 10 with the main portion 12 and the separable portion 14, or as a day equipment bag by using only the separable portion 14.

Further, to assist in transporting the main portion 12 and the separable portion 14 when joined to one another, the bag 10 can include a carrying handle 80 that is releasably secured to the frame 16. The carrying handle 80 extends over or around the second enclosure 56 between opposite ends of the elongate portion 20 of the frame 16 to not only provide a carrying point for the bag 10 but also to provide additional securing of the separable portion 14 to the main portion 12.

Other features that can be included with the bag 10 are, but are not limited to:

Bat Pack/Second Enclosure Adjustments/Optional Structures:
  outside helmet holder and clips
  a heavy duty nylon strap to lift bag when connected to base
  velted valuables pocket where the black velcro was
  zipper pocket in place of the helmet holder
  mesh vented windows on compartments (cover can zip off)
  shelf/floor piece to bottom of bag for stability, while also keeping the vinyl bag to eliminate dirt
  inside zipper mesh pocket into 2 compartments
Bat Bag Base/Frame Adjustments/Optional Structures:
  zipper closure on main/second compartment at front and top of main/second compartment
  insulated side pocket for drinks
  nylon bat compartment that holds 4 bats and zips close (conceals bats) to the hard shell
  retracting handle large heavy duty wheels for rolling
  hard shell needs to expand to fully protect bats, while remaining flat so bat pack can connect to it
Various other alternatives are contemplated as being within the scope of the following claims particularly pointing out and distinctly claiming the subject matter regarded as the invention.

I claim:

1. An assembly for the transportation of sporting equipment and bags, comprising:
  a) a substantially rigid frame, said frame comprising an elongate portion and a short portion, said elongate portion defining an interior having a closure and a plurality of partitioned spaces, each partitioned space defining a channel dimensioned to accommodate a baseball bat, said frame further comprising a handle and wheels;
  b) a first enclosure and a second enclosure, said first enclosure configured to be supported on the short portion of the frame and the second enclosure configured to be supported by the first enclosure and the elongate portion of the frame;
  c) said first and second enclosures being removably attached to the frame using a plurality of straps so that the frame and first and second enclosures are moveable as a single unit; and
wherein the first enclosure and the second enclosure are dimensioned so that a height of the first enclosure and the second enclosure when stacked vertically substantially equals a height of the elongate portion; and
wherein a depth and width of the first enclosure and the second enclosure are substantially equivalent to a depth and width of the short portion of the frame.

2. The assembly of claim 1, wherein the first enclosure includes at least one insulated compartment therein.

3. The assembly of claim 1, wherein the first enclosure is fixed to the frame and wherein the second enclosure is removably attached to the first enclosure.

4. The assembly of claim 1, wherein the second enclosure includes at least one carrying strap thereon.

5. The assembly of claim 1, wherein the second enclosure includes at least one bat sleeve thereon.

6. The assembly of claim 1, wherein the handle is a telescoping handle.

* * * * *